United States Patent [19]

Ueno et al.

[11] Patent Number: 5,236,617

[45] Date of Patent: Aug. 17, 1993

[54] OXYGEN ABSORBENT

[75] Inventors: Ryuzo Ueno, Nishinomiya; Akihiko Tabata, Ushiku, both of Japan

[73] Assignee: K.K. Ueno Seiyaku Oyo Kenkyujc, Osaka, Japan

[21] Appl. No.: 872,941

[22] Filed: Apr. 21, 1992

Related U.S. Application Data

[62] Division of Ser. No. 699,011, May 13, 1991, Pat. No. 5,128,060.

[30] Foreign Application Priority Data

May 16, 1990 [JP] Japan .................. 2-127755
Apr. 1, 1991 [JP] Japan .................. 3-68332

[51] Int. Cl.$^5$ .............................. C09K 15/02
[52] U.S. Cl. .................. 252/188.28; 252/184; 252/397
[58] Field of Search ............... 252/184, 188.28; 426/106

[56] References Cited

U.S. PATENT DOCUMENTS

| | | | |
|---|---|---|---|
| 4,524,015 | 6/1985 | Takahashi et al. | 252/188.28 |
| 4,579,223 | 4/1986 | Otsukou et al. | 206/204 |
| 4,588,561 | 5/1986 | Aswell et al. | 422/238 |
| 4,856,650 | 8/1989 | Inoue | 206/204 |
| 4,908,151 | 3/1990 | Inou et al. | 252/188.28 |
| 4,980,215 | 12/1990 | Schonbrun | 428/72 |
| 5,102,673 | 4/1992 | Sugihara et al. | 426/124 |
| 5,128,060 | 7/1992 | Ueno et al. | 252/184 |

*Primary Examiner*—Richard D. Lovering
*Assistant Examiner*—Joseph D. Anthony
*Attorney, Agent, or Firm*—Sughrue, Mion, Zinn, Macpeak & Seas

[57] ABSTRACT

A new oxygen absorbent which is used sealed in a pack with a food to prevent the food from deteriorating is disclosed, in which the oxygen absorbent contains ascorbic acid and/or salts thereof, an alkaline compound such as sodium carbonate, a reaction accelerator such as ferrous sulfate, and a silica gel, and improves the flowability and the oxygen absorbability.

3 Claims, No Drawings

OXYGEN ABSORBENT

This is a divisional of application Ser. No. 07/699,011 filed May 13, 1991 now U.S. Pat. No. 5,128,060.

BACKGROUND OF THE INVENTION

The present invention relates to an oxygen absorbent.

An oxygen absorbent is broadly used as sealed into a food pack for the purpose of preventing the food from deteriorating due to denaturation, discoloration, oxidation and the like. Typical oxygen absorbents which have been widely used include an oxygen absorbent comprising an iron powder and an oxygen absorbent comprising an ascorbic acid. The oxygen absorbent according to the present invention belongs to the latter.

In a general form the oxygen absorbent comprising the ascorbic acid is used packed into an air permeable small bag together with another additives. Various improved methods have been proposed in this type oxygen absorbent, for instance, (1) improvement in the oxygen absorbability of ascorbic acid by the addition of an alkaline material or a deliquescing material (e.g. Japanese Patent Application KOKAI Nos. 54-132246, 55-61914, and 54-98348), and (2) allowing an aqueous solution of the above composition (1) to adsorb into an suitable adsorbent and to granulate the resultant, if necessary (e.g. Japanese Patent Application KOKAI Nos. 47-30845, 53-46490, 54-8186). The method (1) aforementioned is worse in the productivity because of the deliquescence due to the alkaline material or deliquescing material, which makes the packing efficiency worse and the high speed packing impossible. The method (2) aforementioned can improve the above defect of the method (1), but in KOKAI No. 53-46490 too much amount of absorbent is required to adsorb an sufficient amount of water and ascorbic acid in the adsorbent as exemplified pulp, soybean protein, popcorn powder, polyurethane, sawdust, diatomaceous earth, and the like. In KOKAI No. 54-8186 the alkaline material is used adsorbed in a diatomaceous earth. The both methods are insufficient in the flowability of the powder.

The Japanese Patent Application KOKAI No. 59-232078 discloses a granular oxygen absorbent in which an activated carbon is used as a binder. In this method complicate operation and a high price machine are indispensable for the granulating process.

The Japanese patent Application KOKAI No. 59-29033 proposes the use of carbon black as a filler to improve the flowability in the automatic packaging process and to pack it with correct measurement. This publication also discloses the co-use of ascorbic acid and an iron compound.

The use of carbon black, however, makes the appearance diety because the black powder adheres at the sealing portion of the small bag at packing, or pollutes the working condition by the black dust. As the appearance of the pack is liable to become blackish and deteriorate the commercial value for foods, especially, the packing operation must be strictly controlled. Further, as the powder easily coagulates and is worse in flowability, the granulation is in dispensable. In addition, a carbon black is dangerous because of possible firing when supplied in a microwave oven together with the packaged food.

SUMMARY OF THE INVENTION

The object of the present invention is to provide an oxygen absorbent improved in the flowability so as to enable the high speed packing.

The another object of the present invention is to provide an oxygen absorbent improved in the oxygen absorption rate and the durability.

The above object can be achieved by formulating an alkaline compound, reaction accelerator and silica gel together with ascorbic acid and/or salt thereof.

DETAILED DESCRIPTION OF THE INVENTION

The present invention relates to an oxygen absorbent comprising ascorbic acid and/or salt thereof, an alkaline compound, a reaction accelerator and silica gel.

According to the present invention the ascorbic acid includes L-ascorbic acid, and D-iso-ascorbic acid (erythrobic acid). D-iso-ascorbic acid is fairly cheaper than L-ascorbic acid, but has a tendency to insufficiently exhibit its oxygen absorbing activity in comparison with the D-ascorbic acid due to the steric hindrance, but it exhibits the oxygen absorption effect exhibits more rapidly rather than the D-ascorbic acid does, when it is used together with silica gel. Therefore, the co-use of the D-iso-ascorbic acid and the silica gel is especially preferable embodiment in the present invention. The L-ascorbic acid and the D-iso-ascorbic acid may be used together.

The ascorbic acid may be used as a free acid or a salt including a partially neutralized salt with, for instance, an alkaline metal, alkaline earth metal, and the like. Particularly preferable salts are sodium, potassium, calcium salts and the like.

The ascorbic acid and/or salt thereof are preferably used in the amount of 10-60 percent by weight, more preferably 15-50 percent by weight based on the total amount of oxygen absorbent. If the amount of the ascorbic acid and/or the salt is less than 10 percent by weight, too much amount of the oxygen absorbent must be used in one food package in order to achieve satisfying result. If the amount is more than 60 percent, the content of the other ingredients relatively reduce so that the total balance of the efficiencies based on each ingredient is lost, especially if the amount of the silica gel is reduced, the flowability which is a main object of the present invention becomes insufficient. The oxygen absorption can be achieved by the use of ascorbic acid and/or the salt together with an alkaline compound.

According to the present invention a suitable alkaline material includes, for instance, hydroxide, carbonate, hydrogen carbonate, and organic acid salt such as acetic acid, lactic acid, citric acid, malic acid, and oxaloacetic acid of an alkaline metal, alkaline earth metal, aluminum and the like. Carbonates and hydrogen carbonates are especially preferable, because these salts generate carbon dioxide gas according to the absorption of oxygen in the package so as to improve the preservation of a food by the action of the generated carbon dioxide gas and maintain the inner pressure of the food package. Particularly preferable alkaline materials are sodium carbonate, potassium carbonate, sodium hydrogen carbonate and potassium hydrogen carbonate.

The alkaline material is preferably used in the amount of 1-60 percent by weight, more preferably 5-50 percent by weight of the total amount of oxygen absorbent. When the amount of the alkaline material is more than 60 percent by weight or less than 1 percent by weight the oxygen absorbability is insufficiently achieved.

The reaction accelerator according to the present invention is a material having a catalytic activity for the oxygen absorption of ascorbic acid and/or the salt thereof. When the reaction accelerator is not used the oxygen absorption efficiency, especially oxygen absorption rate tends to decrease.

As a reaction accelerator an activated carbon, a transition metal such as iron, copper, zinc, and the like or the salt can be used. Preferable one is the activated carbon or the iron-containing compounds (referred to as iron compounds hereinafter) in the aspect of the activity and safety. The iron compound includes ferrous salts or ferric salts or may be inorganic salts or organic salts. There are exemplified sulfates, chlorides, citrates, oxalates and the like. Water soluble salts are especially preferable. As the most preferable iron compound there are exemplified ferrous sulfate, ferrous chloride, ferric sulfate, and ferric chloride.

The reaction accelerator may be used in the amount of 1-200 parts by weight, more preferably 5-100 parts by weight based on 100 parts by weight of ascorbic acid and/or the salt thereof. When the amount of the reaction accelerator is less than 1 part by weight or more than 200 parts by weight, sufficient oxygen absorption cannot be achieved.

In the present invention water plays an important role for exhibiting the oxygen absorption by the ascorbic acid and/or the salt. The water may exist in any form. For instance, it may be added when each ingredient is mixed, or ingredient into which water is separately mixed may be added. For example, water can be added impregnated or adsorbed into a water adsorbent such as vermiculite, zeolite and the like; provided in the form of water of crystallization in an ingredient; or provided in the form of vapor from a food to be packaged. In a preferable embodiment the water may be separately provided by any way in the aspect of the oxygen absorption rate or width of applicability to food. In this case the amount of water is preferably 5-50 percent by weight, especially 10-35 percent by weight based on the total amount of the oxygen absorption to be used. When the amount of the water is less than 5 percent by weight, the efficiency of the oxygen absorption tends to reduce and is insufficient in a dried food, and is liable to scatter. When the amount of water exceeds 50 percent by weight, the flowability decreases.

In the present invention the silica gel may be a liquid phase producing silica gel which is prepared, for example, by decomposing sodium silicate with an acid in a liquid phase, or a vapor phase producing silica gel which may be prepared, for example, by hydro-pyrolysis of halogenated silicon in vapor phase. Preferable particle size of the silica gel is less than 1000 μm or less, more preferably 500 μm or less due to its excellent flowability and efficiency. Though there are silica gels containing micropores and those having substantially no micropore, the latter is more preferable when compared in the same particle size because of an excellent flowability, and L-ascorbic acid is used as a main ingredient. Such a silica gel having substantially no micropore can be obtained from a vapor phase production in general.

When D-iso-ascorbic acid is used as a main ingredient, substantially the same results are obtained in the both of silica gels having micropores and those having no micropore when compared in the same particle size.

The silica gel is preferably used in the amount of 5-50 percent by weight, more preferably 10-30 percent by weight based on the total weight of oxygen absorbent. When the amount is less than 5 percent by weight the flowability lowers, and when more than 50 percent by weight the scattering increases.

The oxygen absorbent of the present invention may comprises another additives, for example, a deodorizer such as activated carbon in order to absorb the smell of ascorbic acid; a moisture controller of the oxygen absorbent, for example, a water soluble salt, water miscible solvent such as alcohol and the like.

The oxygen absorbent of the present invention may be produced by simply mixing the each ingredient. Alternatively, for instance, an aqueous solution or dispersion of the reaction accelerator is previously mixed with a silica gel homogeneously to give a flowable powder, and the powder obtained is mixed with the powder of ascorbic acid and/or salt thereof and the powder of the alkaline compound, and then the resultants may be used in a separate form or a homogeneous mixture. The aforementioned processes for production are only examples. Any other alternative productions are applicable.

The obtained oxygen absorbent may be packed into an air permeable bag in a suitable amount.

The present invention is illustrated by the Examples, but it should not be construed restrictively to these Examples.

EXAMPLE 1

The ingredients used in the Example 1 are as follow:
sodium salt of L-ascorbic acid (reagent),
silica gel (Aerosil 200, vapor phase produced silica gel having an average diameter of about 12 nm, available from Nippon Aerosil K.K.),
$Na_2CO_3 \cdot H_2O$ (reagent),
$NaHCO_3$ (anhydride, reagent),
$FeSO_4 \cdot 7H_2O$ (reagent), and
water The ferric sulfate was dissolved in water, and the sodium salt of L-ascorbic acid, sodium carbonate and sodium hydrogen carbonate were added into the aqueous solution obtained. The silica gel was then added and homogeneously mixed. The resultant mixture was packed into a bag (5.0×6.0 cm) of laminated film of Japanese paper and perforated polyethylene film in such amount that about 1 gram of the sodium salt of L-ascorbic acid was contained in a bag. The amounts of ingredients used are shown in Table 1.

EVALUATION

The oxygen absorbents obtained were sealed into packs (500 ml) of KON/PE (laminated film of polyvinylidene chloride coated nylon film and polyethylene film) together with air, respectively. The sealed packs stored at 30° C., and the remaining oxygen content in each pack was determined by an oxygen concentration microanalyzer (RO-101S, available from Iijima Denshi Kogyo K.K.) with time. The results were shown in Table 1.

TABLE 1

| ingredients | formulation number | | | | |
|---|---|---|---|---|---|
| (parts by weight) | 1 | 2 | 3 | 4 | 5 |
| sodium L-ascorbate | 10 | 10 | 10 | 10 | 10 |
| silica gel | 5 | 5 | 5 | 5 | 5 |
| sodium carbonate | 0.63 | 0.63 | 2.5 | 2.5 | 5 |

TABLE 1-continued

| | | | | | |
|---|---|---|---|---|---|
| sodium hydrogen carbonate | 1.5 | 1.5 | 6 | 6 | 12 |
| ferrous sulface | 0.5 | 2 | 1 | 2 | 2 |
| water | 6 | 6 | 6 | 6 | 6 |

| keeping time | remaining oxygen concentration (%) | | | | |
|---|---|---|---|---|---|
| 5 hr | 7.78 | 5.20 | 8.51 | 5.32 | 10.27 |
| 24 hr | 0.12 | 0.04 | 0.15 | 0.08 | 1.10 |
| 48 hr | 0.06 | 0.02 | 0.06 | 0.05 | 0.06 |

EXAMPLE 2

Oxygen absorbing test was repeated according to the same manner as in the Example 1 except that the amount of silica gel was changed, and the samples were kept at 15° C. In addition the carbon dioxide concentration in the packs were determined after 93 hours. The results were shown in Table 2.

TABLE 2

| ingredients (parts by weight) | formulation number | | |
|---|---|---|---|
| | 1 | 2 | 3 |
| sodium L-ascorbate | 10 | 10 | 10 |
| silica gel | 2.5 | 5 | 10 |
| sodium carbonate | 2.5 | 2.5 | 2.5 |
| sodium hydrogen carbonate | 6 | 6 | 6 |
| ferrous sulfate | 2 | 2 | 2 |
| water | 6 | 6 | 6 |

| keeping time | remaining oxygen concentration (%) | | |
|---|---|---|---|
| 5 hr | 19.35 | 6.56 | 12.69 |
| 23 hr | 14.11 | 0.08 | 2.19 |
| 43 hr | 9.85 | 0.06 | 0.05 |
| 93 hr | 0.10 | <0.01 | <0.01 |
| CO$_2$ concentration after 93 hours (%) | 23.2 | 20.8 | 22.0 |

EXAMPLE 3

An oxygen absorbent was prepared according to the EXAMPLE 1 in the following formulation, and the oxygen absorbability was evaluated.

| formulation | parts by weight |
|---|---|
| sodium L-ascorbate | 10 |
| silica gel (Aerosil OX 50, average diameter 40 nm, produced in vapor phase, available from Nippon Aerosil K.K.) | 5 |
| Na$_2$CO$_3$.H$_2$O | 2.5 |
| NaHCO$_3$ | 6 |
| FeSO$_4$.6H$_2$O | 2 |
| activated carbon | 1 |

-continued

| formulation | parts by weight |
|---|---|
| water | 3 |

The obtained oxygen absorbent was grey powder, excellent in flowability and suitable for high speed packing. This oxygen absorbent each 3.0 g was packed into a bag of laminated film of Japanese paper and perforated polyethylene film (6.0×6.5 cm), and then left for 0, 1, 2 and 4 hours. The oxygen absorbent bag was sealed into a pack of KON/PE together with 500 ml air, kept at 25° C., and remaining oxygen concentration in the pack was determined with time using an oxygen concentration microanalyzer. The results were shown in Table 3.

TABLE 3

| time of leaving (hr) | keeping time at 25° C. (hr) | | | | |
|---|---|---|---|---|---|
| | 4 | 8 | 24 | 32 | 48 |
| 0 | 8.16 | 5.44 | 0.08 | | |
| 1 | 9.55 | 5.88 | 0.47 | 0.15 | 0.02 |
| 2 | 10.36 | 6.88 | 0.99 | 0.44 | 0.03 |
| 4 | 11.48 | 7.89 | 1.63 | 0.68 | 0.09 |

(remaining oxygen concentration %)

EXAMPLE 4

Oxygen absorbents were obtained from the formulation shown in Table 4 (1). In the formulations, Nos. 5 and 7 correspond to the oxygen absorbents of Japanese Patent Application KOKAI Nos. 59-29033 and 59-232078 respectively.

TABLE 4 (1)

| ingredient (parts by weight) | formulation number | | | | | | | |
|---|---|---|---|---|---|---|---|---|
| | 1 | 2 | 3 | 4 | 5 | 6 | 7 | 8 |
| Na L-ascorbate | 10 | | 10 | | 10 | | 10 | |
| Na D-iso-ascorbate (monohydrate) | | 10.9 | | 10.9 | | 10.9 | | 10.9 |
| Na$_2$CO$_3$ | | | | | 5 | 5 | | |
| Na$_2$CO$_3$.H$_2$O | 2.5 | 2.5 | 2.5 | 2.5 | | | | |
| Na$_2$CO$_3$.10H$_2$O | | | | | | | 10 | 10 |
| NaHCO$_3$ | 6 | 6 | 6 | 6 | 12 | 12 | 10 | 10 |
| FeSO$_4$.7H$_2$O | 2 | 2 | 2 | 2 | 2 | 2 | 1 | 1 |
| water | 6 | 5.1 | 6 | 5.1 | 6 | 5.1 | | |
| silica gel (1) | 5 | 5 | | | | | | |
| activated carbon | | | | | | | 2 | 2 |
| carbon black | | | | | 10 | 10 | | |
| silica gel (2) | | | 5 | 5 | | | | |

(1) Aerosil 200
(2) Finesil (average diameter 18 nm, produced in liquid phase, available from Tokuyama Soda K.K.)

The oxygen absorbents shown in Table 4 (1) were packed into bag of laminated film of Japanese paper and perforated polyethylene film (6.0×6.0 cm) in such amount that about one gram of the Na L-ascorbate or Na D-iso-ascorbate as an anhydride was contained in one pack. Each packed oxygen absorbent was sealed into a pack of laminated film of KON and PE together with 500 ml air, kept at 25° C. for given periods, and the remaining oxygen concentration was determined with time. The results were shown in Table 4 (3). The formulation No. 3 tends to become paste-like, and worse in the flowability in comparison with the formulation No. 1.

TABLE 4 (2)

| formulation number | charged amount |
|---|---|
| 1 | 3.2 g |

TABLE 4 (2)-continued

| formulation number | charged amount |
|---|---|
| 2 | 3.2 |
| 3 | 3.2 |
| 4 | 3.2 |
| 5 | 4.5 |
| 6 | 4.5 |
| 7 | 3.3 |
| 8 | 3.4 |

TABLE 4 (3)

| No. | keeping time (hour) | | | | | | | | |
|---|---|---|---|---|---|---|---|---|---|
| | 4 | 8 | 16 | 20 | 24 | 28 | 32 | 40 | 44 |
| 1 | 9.42 | 5.21 | 1.43 | 0.51 | 0.23 | 0.05 | | | |
| 2 | 10.32 | 4.21 | 0.80 | 0.19 | 0.04 | | | | |
| 3 | 11.51 | 8.01 | 4.15 | 2.99 | 2.22 | 1.75 | 0.94 | 0.20 | 0.05 |
| 4 | 10.23 | 7.22 | 2.74 | 1.05 | 0.77 | 0.23 | 0.01 | | |
| 5 | 5.04 | 1.97 | 1.26 | 0.61 | 0.28 | 0.06 | | | |
| 6 | 16.80 | 15.41 | 13.53 | 12.10 | 11.51 | 10.40 | 9.31 | 7.28 | 6.51 |
| 7 | 17.84 | 16.26 | 9.28 | 7.29 | 5.95 | — | — | 2.70 | 2.10 |
| 8 | 18.20 | 16.03 | 12.35 | 10.96 | 10.08 | 9.01 | 7.40 | 6.23 | 5.05 |

(remaining oxygen concentration; %)

As apparent from the above results Na D-iso-ascorbate was more excellent in the oxygen absorption rate than the Na L-ascorbate, which was fairly different from the results obtained from the oxygen absorbent of conventional formulation (without silica gel). That is, according to the present invention Na D-iso-ascorbate which is more economical can be successfully used.

EXAMPLE 5

After the oxygen absorbents of the EXAMPLE 4 (2) were left for 0, 1, 2, and 3 hours respectively, they were sealed in KON/PE packs together with 500 ml air, kept at 25° C. for given periods, and the remaining oxygen concentration were determined. The results were shown in Table 5.

TABLE 5

| leaving time (h) | keeping time (hour) | | | | | | | |
|---|---|---|---|---|---|---|---|---|
| | 4 | 8 | 20 | 24 | 28 | 32 | 40 | 44 |
| 0 | 10.27 | 5.33 | 0.23 | 0.06 | | | | |
| 1 | 10.68 | 6.95 | 0.91 | 0.27 | 0.09 | | | |
| 2 | 10.45 | 6.44 | 2.58 | 1.45 | 0.43 | 0.05 | | |
| 3 | 12.66 | 9.57 | 5.31 | 3.77 | 1.25 | 0.53 | 0.33 | 0.09 |

(remaining oxygen concentration; %)

As apparent from the above results the oxygen absorbent obtained from Na D-iso-ascorbate has an ability to reduce the remaining oxygen concentration to less than 0.1% through 44 hours even in case that it was left for 3 hours in air. These results indicate that these oxygen absorbents are practically applicable.

EXAMPLE 6

The oxygen absorbents of the Example 4 (2), (6), and (8) were put into glass bottles of 200 ml respectively, which were then heated for ten minutes in a microwave oven having an electrical output pressure of 500 W as observing them. As the results, the contents of oxygen absorbents of the Examples 4 (6) and (8) became burned within 5 minutes to give rise to odd smell, and when additionally heated the bag itself was burned, but the formulation (2) corresponding to the oxygen absorbent of the present invention did not exhibit any change in the appearance after 10 minutes.

EXAMPLE 7

Oxygen absorbents were prepared according to the Example 4 (1) using a carbon black or an activated carbon instead of the silica gel. The obtained oxygen absorbents were filled using a high speed automatic charging machine (SAM-P7-D type: available from Sanko Kikai K.K.). The oxygen absorbent of the formulation (1) was so excellent in the flowability that it could be quickly charged, but one in which the carbon black was used was made the paste itself and another in which the activated carbon was used was so bad in the flowability that it could not be qualitatively charged due to its worse flowability from a hopper.

EXAMPLE 8

Oxygen absorbents were prepared according to the formulation described in Table 6. Each oxygen absorbent 5 g was packed with polyester laminated film (perforated polyester/polyethylene adhesive agent/paper/-perforated polyethylene), and sealed together with 500 ml air in a KON/PE pack. Each sealed pack was kept at 25° C., and the oxygen absorbing time (the time necessary for reducing the remaining oxygen concentration to less than 0.1%) was determined. The results were shown in Table 6.

TABLE 6

| ingredient (parts by weight) | formulation number | | | | |
|---|---|---|---|---|---|
| | a | b | c | d | e |
| Na L-ascorbate | 10 | 10 | — | — | — |
| Na D-iso-ascorbate (monohydrate) | — | — | 10 | 10 | 10 |
| $Na_2CO_3.H_2O$ | 2.5 | — | 2.5 | 2.5 | 2.5 |
| $NaHCO_3$ | 6 | — | 6 | 6 | 6 |
| $CH_3COONa.3H_2O$ | — | 10 | — | — | — |
| $FeSO_4.7H_2O$ | — | 5 | — | — | — |
| $FeCl_2$ | — | — | 3 | 3 | 3 |
| activated carbon | 5 | — | 2 | 2 | 2 |
| vermiculite | — | — | — | — | 4 |
| water | 8 | 15 | 5 | 5 | 12 |
| silica gel A | 5 | 10 | — | — | — |
| silica gel B | — | — | 5 | — | — |
| silica gel C | — | — | — | 5 | — |
| silica gel D | — | — | — | — | 5 |
| oxygen absorbing time (hr) | 50 | 7 | 30 | 15 | 10 | silica gel A: Reolosil (diameter 5–50 nm, produced in vapor phase, available from Tokuyama Soda K.K.),
silica gel B: reagent (diameter 1–5 μm, produced in liquid phase, available from Sigma K.K.),
silica gel C: Wako Gel C-200 (diameter 75–150 μm, produced in liquid phase, available from Wako Jyunyaku K.K.),
silica gel D: Tokusil PR (diameter 50–350 μm, produced in liquid phase, available from Tokuyama Soda K.K.)

EXAMPLE 9

Oxygen absorbents were prepared according to the formulation indicated in Table 7. The flowability and the scattering property of the oxygen absorbent were observed. Each oxygen absorbent was packed in a non-woven bag made of polyethylene (Trade name: Luxer, available from Asahi Kasei Kogyo K.K.) in such amount that one gram of Na D-iso-ascorbate as an anhydride was contained in one bag, and each bag was sealed together with 500 ml air and a filter paper (No. 2, diameter of 11 cm, available from Advantic Toyo K.K.) impregnated with water of 1 ml within a KON/PE pack. The oxygen absorbing time was determined according the same manner as in the Example 8. The results were shown in Table 7.

TABLE 7

| ingredient (parts by weight) | formulation number | | | | | | | |
| --- | --- | --- | --- | --- | --- | --- | --- | --- |
|  | a | b | c | d | e | f | g | h |
| Na (D-iso-ascorbate (monohydrate) | 12 | 12 | 12 | 12 | 12 | 12 | 12 | 12 |
| Aerosil 200 | 8 | 8 | 8 | 8 | 8 | 8 | 8 | 8 |
| $Na_2CO_3$ | 2.5 | 2.5 | 2.5 | 2.5 | 2.5 | 2.5 | 2.5 | 2.5 |
| $KHCO_3$ | 6 | 6 | 6 | 6 | 6 | 6 | 6 | 6 |
| $FeSO_4 \cdot 1\text{-}1.5H_2O$ | 3 | 3 | 3 | 3 | 3 | 3 | 3 | 3 |
| water | 0 | 1 | 2 | 4 | 8 | 12 | 20 | 32 |
| water content (%) | 0 | 3.0 | 6.0 | 11.3 | 20.3 | 27.6 | 38.8 | 50.4 |
| filling amount (g) | 3.0 | 3.1 | 3.2 | 3.4 | 3.8 | 4.1 | 4.9 | 6.0 |
| flowability | G | G | G | G | G | G | L-B | B* |
| scattering | B | L-B | no | no | no | no | no | no |
| oxygen absorbing time (hr) | 27 | 40 | 29 | 19 | 14 | 10 | 140 | 200 |

G: good, L-B: a little bad, B: bad, *: paste

EXAMPLE 10

An oxygen absorbent was prepared by mixing sodium L-ascorbate 10 parts by weight, Reolosil 10 parts by weight, Ca(OH)$_2$ 10 parts by weight, CuSO$_4$.5H$_2$O 5 parts by weight and water 15 parts by weight. The mixture 5 g was packed into a bag (4.5×8.0 cm) made of Luxer, sealed together with a sponge cake of about 50 g within a pack of KON/PE, and kept at 30° C. As a comparative a sealed sponge cake within a pack of KON/PE without the oxygen absorbent was kept under the same condition. In the latter mold gathered on the cake after 7 days, but in the former no change in the appearance was observed after 30 days, and the cake can be eaten.

What is claimed is:

1. An oxygen absorbent comprising: 1) an ascorbic compound selected from the group consisting of L-ascorbic acid, L-ascorbic acid salt, and mixtures thereof, present in an amount of 10 and 60 percent by weight base on the total weight of the oxygen absorbent, 2) an alkaline compound selected from the group consisting of hydroxides, carbonates, hydrogen carbonates, an organic salt of an alkaline earth metal, and an organic acid salt of aluminum present in an amount of 1 to 60 percent by weight base on the total weight of the oxygen absorbent, 3) a reaction accelerator present from 1 to 200 parts by weight based on 100 parts by weight of the ascorbic compound, and 4) a silica gel present in an amount of 5 to 50 percent by weight base on the total weight of the oxygen absorbent.

2. The oxygen absorbent of claim 1, wherein said reaction accelerator is an iron compound.

3. The oxygen absorbent of claim 2, wherein said reaction accelerator is a ferrous salt or a ferric salt.

* * * * *